US008270571B2

(12) United States Patent
Bernhardt et al.

(10) Patent No.: US 8,270,571 B2
(45) Date of Patent: Sep. 18, 2012

(54) RADIATION SOURCE, IMAGING SYSTEM, AND OPERATING METHOD TO DETERMINE AND PRODUCE A RADIATION FOCAL SPOT HAVING AN ASYMMETRICAL POWER INPUT PROFILE

(75) Inventors: Philipp Bernhardt, Forchheim (DE); Matthias Seufert, Pettstadt (DE)

(73) Assignee: Siemens Aktiengesellschaft, Munich (DE)

( * ) Notice: Subject to any disclaimer, the term of this patent is extended or adjusted under 35 U.S.C. 154(b) by 192 days.

(21) Appl. No.: 12/789,798

(22) Filed: May 28, 2010

(65) Prior Publication Data

US 2010/0303203 A1 Dec. 2, 2010

(30) Foreign Application Priority Data

May 29, 2009 (DE) ........................ 10 2009 023 183

(51) Int. Cl.
*G01N 23/04* (2006.01)
*H01J 35/14* (2006.01)

(52) U.S. Cl. ........................................ 378/138; 378/62

(58) Field of Classification Search .................... 378/62, 378/138, 136, 144
See application file for complete search history.

(56) References Cited

U.S. PATENT DOCUMENTS

| | | | | |
|---|---|---|---|---|
| 6,968,039 | B2 * | 11/2005 | Lemaitre et al. | 378/138 |
| 6,980,623 | B2 * | 12/2005 | Dunham et al. | 378/19 |
| 7,496,180 | B1 * | 2/2009 | Subraya et al. | 378/137 |
| 2010/0008470 | A1 | 1/2010 | Hauttmann et al. | |

* cited by examiner

*Primary Examiner* — Irakli Kiknadze
(74) *Attorney, Agent, or Firm* — Schiff Hardin LLP

(57) ABSTRACT

A radiation source for a radiation-based image acquisition device has an electron emitter to generate a focal spot for x-ray generation at a rotating anode. An arrangement is provided to generate an asymmetrical power input profile of the focal spot parallel to the movement direction of the rotating anode.

15 Claims, 3 Drawing Sheets

RADIATION SOURCE, IMAGING SYSTEM, AND OPERATING METHOD TO DETERMINE AND PRODUCE A RADIATION FOCAL SPOT HAVING AN ASYMMETRICAL POWER INPUT PROFILE

BACKGROUND OF THE INVENTION

1. Field of the Invention

The invention concerns: a radiation source for a radiation-based image acquisition device, having an electron emitter to generate a focal spot for x-ray generation at a rotating anode, as well as a radiation-based image acquisition device with such a radiation source, and a method to determine an asymmetrical power input profile of a focal spot of a radiation source parallel to a movement direction of a rotating anode of the radiation source.

2. Description of the Prior Art

Powerful radiation sources are needed today in many fields in which x-ray radiation is required, such as for imaging, particularly medical imaging Rotating anode x-ray tubes in which an electron beam is generated by means of an electron emitter (cathode) are known as radiation sources. This electron beam is accelerated through a vacuum toward a rotating anode by electrical fields. The impact point of the electron beam on the rotating anode is generally designated as a focal spot. The electrons braking in the anode generate x-ray radiation (characteristic radiation, bremsstrahlung). However, the efficiency is approximately 1%, meaning that 99% of the electrical energy is transduced into heat. In order to prevent melting of the anode, a rotating anode is used so that the focal spot "wanders" along the movement direction of the rotating anode, which means that a point is ever exposed only for a short time.

In order to obtain an optimally sharp and clearly defined x-ray beam, in modern radiation sources the focal spot has an optimally small expansion. However, the smaller the focal spot, the less electrical power can be transduced into radiation energy. The reverse applies, namely that the more power input that occurs at a narrow space in the rotating anode, the shorter the service life of the rotating anode. It is thus typical to optimize the design of the focal spot so that it is fashioned to be homogeneous over optimally wide areas (apart from edges at the border) so that temperature gradients that are too high do not occur. Ultimately the same power input thus ensues at every exposed point.

SUMMARY OF THE INVENTION

An object of the invention is to provide a method with which a higher pulse power density can be achieved so the service life of a rotating anode is improved by optimization with regard to a wider degree of freedom.

This object is achieved in accordance with the invention by a radiation source of the aforementioned type provided with beam modifying structure that interacts with the electron beam, either in the generation (emission) thereof or in the propagation of the electron beam from the emitter to the anode, to produce (cause) an asymmetrical power input profile of the focal spot parallel to the movement direction of the rotating anode.

In the radiation source according to the invention, an asymmetrical focal spot is generated, meaning that the power input profile of the focal spot parallel to the movement direction of the rotating anode at the point of the focal spot is asymmetrical. While it has been shown in calculations that the power input profile of the focal spot perpendicular to the movement direction of the rotating anode should be fashioned homogeneous (thus symmetrical) apart from edges that prevent an excessively high temperature gradient (which can also be provided in the present invention), in accordance with the invention an additional degree of freedom is provided to optimize the radiation source, namely the curve of the power input along the movement direction of the rotating anode (thus in the direction of the focal path course).

With this asymmetrical focal spot profile parallel to the movement direction of the rotating anode, for example, a somewhat higher pulse power density can be produced given the same effective focal spot size, if the power input profile of the focal spot parallel to the movement direction of the rotating anode is made to exhibit an asymmetrically steep rise to a maximum value in the leading region. The energy quantity that flows from the focal spot into the rotating anode plate per time unit is proportional to the temperature difference between the focal spot and the rotating anode plate situated behind it. An optimally high heat energy dissipation is thus achieved when the focal spot is brought to a maximum exposure temperature as quickly as possible upon passage of the electron beam and subsequently is exposed so strongly that the maximum temperature can still be maintained. The maximum temperature is thereby the highest temperature to which it is desired to expose the anode material for service life reasons. It follows from these factors that an optimal focal spot profile/power input profile parallel to the rotating anode movement should exhibit an asymmetrically high initial load, which can be achieved by the present invention. This is contrary to a largely homogeneous course of the focal spot, which ultimately must be selected in terms of its power input so that the maximum temperature is not exceeded even at the end of the focal spot.

However, with the method according to the invention and the use of the additional degree of freedom, it is also possible to increase the service life of the rotating anode (for example given the same power) through a deliberate optimization of the power input profile since, for example, a lower maximum temperature or a lower maximum temperature gradient can be applied. This is described in more detail with respect to the method according to the invention.

Although an optimally ideal power input profile can in principle be determined by a qualitative consideration (as described above, for example) and through tests, the power input profile of the focal spot parallel to the movement direction of the rotating anode can be determined within the scope of an optimization procedure, in particular within the scope of the method according to the invention as described below. A mathematical method is consequently used that determines the ideal spatial curve of the power input in the focal spot (consequently the focal spot geometry) under the possible asymmetrical variants. This determination can be based on diverse optimization criteria, for example with regard to the service life, the quality of the generated x-ray radiation (in particular with regard to the image quality or the pulse power density). An asymmetrical focal spot thus can be specifically determined and used in the radiation source according to the invention.

The beam modifying structure that produces the asymmetrical power input profile can be designed in different ways in the radiation source according to the invention. For example, it is possible to provide an asymmetrical electron emitter (in particular an electron emitter that is thinner on one side). Such an electron emitter consequently itself exhibits an asymmetrical design, meaning that more electrons are emitted on one side than the other given the same heating current. For example, one side of the electron emitter can be formed of a thinner material, such that it becomes hotter given the same heating current. Another structure that can be used in addition is a field generator that generates an electromagnetic field affecting the electron beam that produces the focal spot. Electromagnetic fields are consequently used in order to shape the electron beam between the electron emitter and the rotating anode such that the desired asymmetrical profile forms from this interaction. Particularly in the case of the use of a field generator to generate an electromagnetic field affecting the electron beam, this naturally also can be controllable so that different asymmetrical power input profiles parallel to the movement direction of the rotating anode can be realized in the radiation source.

In addition to the radiation source, the invention also concerns a radiation-based image acquisition device comprising a radiation source according to the invention. The advantages of the radiation source according to the invention can be transferred directly to the image acquisition device, wherein in particular an improved image quality at a radiation receiver of the image acquisition device can be achieved given a correspondingly optimized power input profile.

The invention furthermore concerns a computerized method to determine an asymmetrical power input profile of a focal spot of a radiation source parallel to a movement direction of a rotating anode of the radiation source. In an optimization method for the spatially dependent power input executed by a computerized processor, the time curve of the spatially dependent temperature of the rotating anode depending on the spatially dependent power input is evaluated the spatially dependent heat dissipation for a specific rotation frequency of the rotating anode and related to the material properties of the rotating anode and/or boundary conditions describing the image quality. In the planning stage of a radiation source according to the invention, the method according to the invention thus serves to determine a power input profile optimized towards the corresponding optimization criterion. An optimization method is used that searches for a solution of an equation system that is to be determined according to specific optimization criteria. In general any such known optimization method can be used, thus gradient methods or the like as well as to statistical methods.

The optimization can be implemented with regard to the service life of the rotating anode and/or an optimal image quality and/or a lower power input given the same yield. For example, boundary conditions can be modified that are not specific, hard-set limits but rather should be as low as possible or as high as possible.

With regard to the boundary conditions, at least one limitation of the modulation transfer function of the spatially dependent power input and/or a maximum temperature of the focal path swept by the focal spot on the rotating anode and/or a maximum temperature gradient on the rotating anode is/are taken into account. Limits for the total power input or the like or the pulse power density as well are additionally also conceivable. The boundary conditions with regard to the modulation transfer function of the spatially dependent power input function (or of the x-ray power density derived from this) ultimately define requirements for the quality of the generated x-ray radiation, thus ultimately for the image quality. If such boundary conditions were not applied, ultimately a very large focal spot would be created, but this would be contrary to the generation of an optimally spatially precise, localized x-ray beam. Opposite goals that should be complied with or for which an optimization should take place are consequently defined by the boundary conditions.

The temperature of a location on the rotating anode (consequently the spatially dependent and time-dependent temperature) increases with the power input imparted by the electron beam and falls with the heat dissipation in the rotating anode, wherein naturally both variables can be considered in a time-dependent manner in this regard. The temperature can be viewed as the difference of the power input and the heat dissipation. Although it is possible to also analytically formulate and calculate a corresponding equation system (in particular in one dimension), within the scope of the present invention it can also be provided that a simulation (in particular according to the finite element method) is implemented to determine the time curve of the spatially dependent temperature and/or the time curve of the heat dissipation. For example, a considered location and the spatial elements surrounding this can be considered in order to assess the time period of the passage of the focal spot.

Moreover, it is noted again that, although in general the constant parameters of the rotation frequency are no longer viewed as variable in the equation system, these have a clear and important influence on the optimal profile form.

DESCRIPTION OF THE PREFERRED EMBODIMENTS

Figure 1:
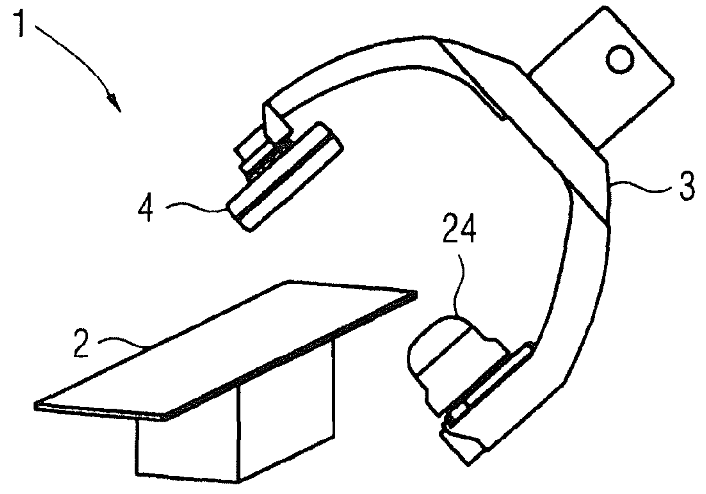
FIG. 1 shows an image acquisition device according to the invention.

FIG. 1 shows a radiation-based image acquisition device 1 (presently a C-arm x-ray device) according to the invention. It has a C-arm 3 that can be pivoted around a patient bed. On the C-arm 3, a radiation source 4 according to the invention and a radiation detector 24 are mounted opposite each other.

Figure 2:
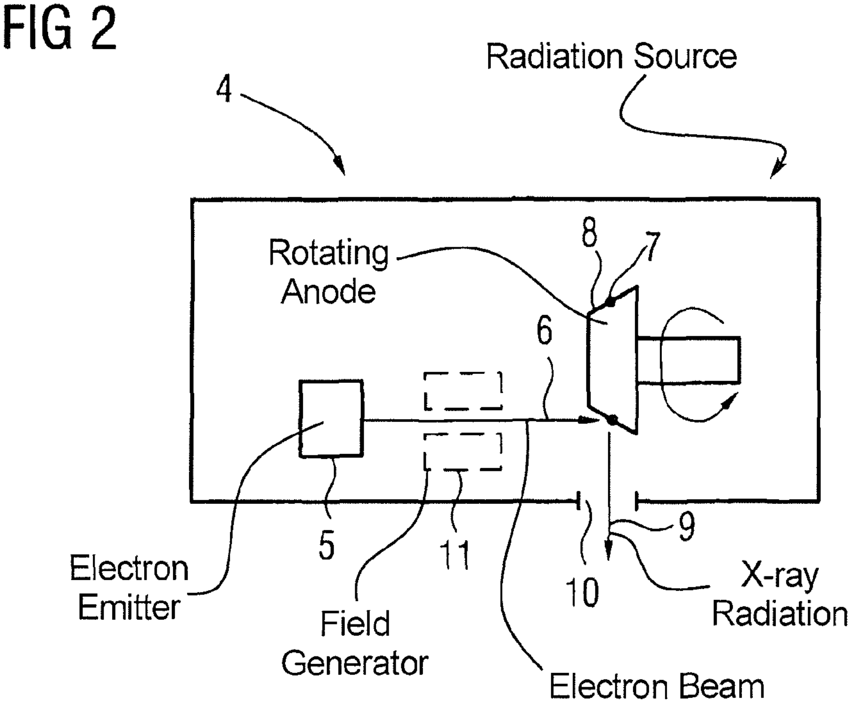
FIG. 2 shows radiation source according to the invention.

FIG. 2 shows the radiation source 4 according to the invention more precisely. As is known, it comprises an electron emitter 5 with which an electron beam 6 is generated that generates a focal spot on the focal path 7 of a rotating anode. X-ray radiation 9 is created there that can exit via a window 10.

In the radiation source 4 additional structure or components are provided in order to generate an asymmetrical power input profile of the focal spot parallel to the movement direction of the rotating anode 8 at the point at which the electron beam 6 strikes the rotating anode 8. Essentially, two possibilities that can also be used in combination are conceivable for this purpose. The electron emitter 5 itself can be fashioned asymmetrically, for example it can have a thinner material towards one side. Alternatively or in addition, a field generator 11 can be provided to generate an electromagnetic field. The field generator 11 can influence the electron beam 6 to cause the asymmetrical profile shape to occur in the movement direction of the rotating anode 8.

Figure 3:
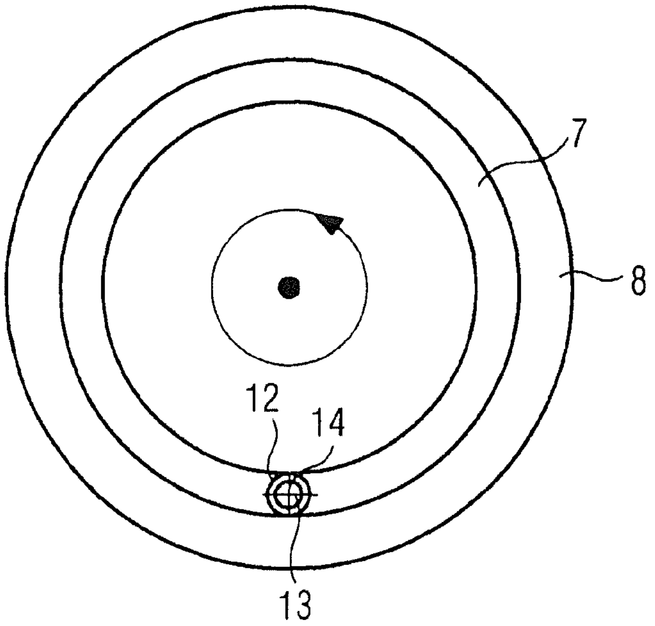
FIG. 3 is a view of the rotating anode of the radiation source according to the invention.
Figure 4:
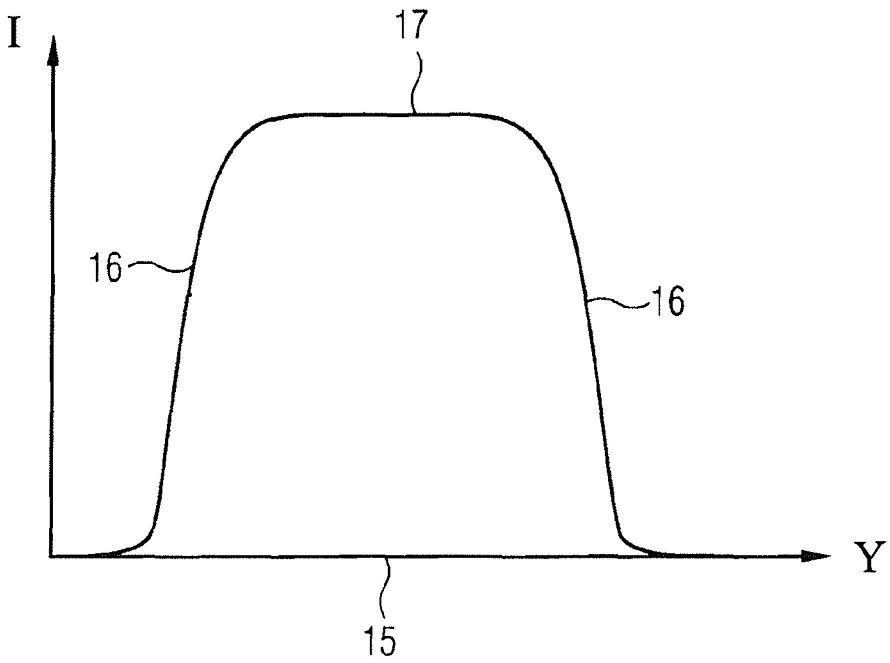
FIG. 4 is a power input profile perpendicular to the movement direction of the rotating anode.

For further explanation, FIG. 3 shows a schematic view of the rotating anode 8 with the circular focal path 7. Additionally indicated is a position of the focal spot 12 whose power input profile should be asymmetrical in the rotation direction of the rotating anode 8 (indicated here by the marking 13). However, an essentially homogeneous power input profile exists in the direction perpendicular to the movement direction (indicated by the marking 14), which should first be shown in detail via FIG. 4. There the intensity (which determines the power input) is plotted against the location Y, wherein 15 marks the middle of the focal spot. Two relatively steeply rising edges 16 clearly exist, such that no temperature gradient that is too strong occurs, wherein the profile is homogeneous over a wide range 17.

Figure 5:
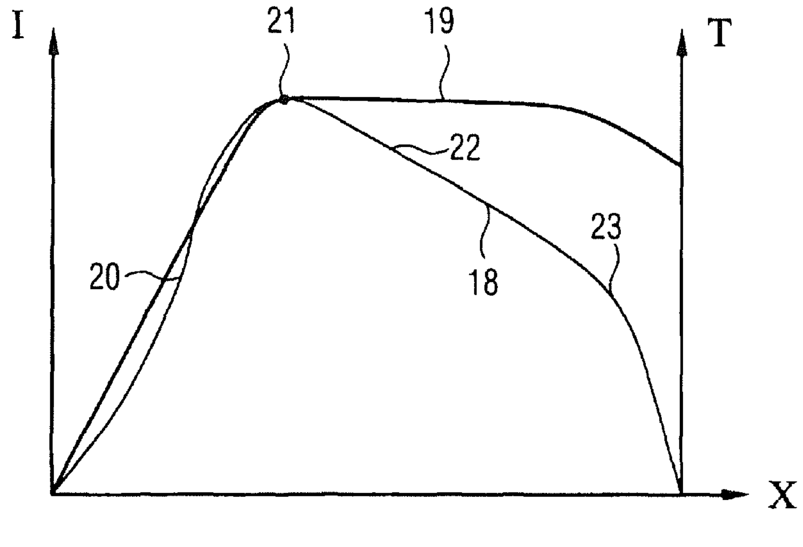
FIG. 5 is a power profile and the temperature curve parallel to the movement direction of the rotating anode.

This is different in the case of FIG. 5, in which the power input is again plotted in the form of the intensity against the location X parallel to the movement direction in the rotating anode 8 (curve 18); the temperature curve at the focal path 7 is represented parallel to this by the curve 19.

The power input clearly initially rises significantly in a first region 20 up to a maximum 21, such that the rotating anode 8 is heated quickly to its maximum temperature (as is apparent from curve 19). The power input is subsequently lowered again in a region 22 and is thereby held just high enough that the maximum temperature is maintained. Finally, the end of the focal spot 12 is reached in the region 23 and the temperature also slowly drops again.

The curve 18 consequently describes an asymmetrical profile with a high initial load. The maximum temperature is reached faster and can be held for a long period of time so that the pulse power density can be increased.

The curve 18 that determines the asymmetrical power input profile in the movement direction of the rotating anode 8 was determined within the scope of the optimization method according to the invention, which should be shown in detail in the following. The optimization of the focal spot shape is based on the following mathematical description. The heat power input into the focal path 7 is described by a function (x, t, ν) that depends on the spatial parameter (anode movement direction) x, the time parameter t and the rotation frequency ν of the rotating anode 8. The parameter t thus has no effect on the shape of the profile; the parameter ν is constant for the following optimization but has a significant effect on the optimization curve of the power input. The heat power is partially transduced into an x-ray power density described by the function R (P(x, t, μ)).

The temperature of a specific location x, designated by T (x, t), rises with the power input P(x, t) and falls with the heat dissipation K (x, T(x), $T_0$ (x), t) in the rotating anode 8. Naturally the environment of a location must thereby also be taken into account in principle, hence the general spatial dependency. $T_0$ (x) stands for the initial temperature field in the rotating anode 8. Overall this correlation can thus be described as $$T(x,t)=P(x,t)-K(x,T(x),T_0(x),t) \quad (1).$$

Diverse boundary conditions in this regard enter into the equation system to be considered in the optimization method, initially with regard to the service life of the rotating anode 8

$$\max[T(x,t)t]<T_{max} \quad (2) \text{ and}$$

$$\max[dT(x,t)/dx(x),x]<\tau_{max} \quad (3).$$

wherein $T_{max}$ is the allowed maximum temperature of the focal path; $\tau_{max}$ is a maximum temperature gradient that should be allowed.

Conditions related to the image quality are to be considered as "counter-conditions".

$$\mathrm{MTF}(R(P(x,t0)))(f_1)>a_1 \quad (4)$$

Boundary conditions of this type can be formulated for different values of $f_i$ and thus also different limits $a_i$, wherein MTF designates the modulation transfer function.

In the equation system formed from Equations (1)-(4), P(x,t) now represents the unknowns to be sought and optimized. The most different optimization criteria or, respectively, cost functions can be considered depending on to what end an optimization should ensue via the asymmetrical power input profile. For example, an optimization towards an optimally high pulse power density with the same effective focal spot size and invariant service life of the rotating anode 8 can be considered; however, it is also conceivable to optimize the service life of the rotating anode 8 given the same power via an optimization, consequently to select the maximum temperature gradient or the maximum temperature to be as low as possible.

Optimizations to radiation sources can thus be made in a directed manner via the new degree of freedom that is afforded by the present invention.

The heat dissipation K can be determined analytically, but it is also possible to determine this heat dissipation (and possibly also the temperature T) in the manner of a simulation, in particular according to the finite element method.

Although modifications and changes may be suggested by those skilled in the art, it is the intention of the inventors to embody within the patent warranted hereon all changes and modifications as reasonably and properly come within the scope of their contribution to the art.

We claim as our invention:

1. A radiation source comprising:

an electron emitter that emits electrons in an electron beam;

a rotating anode struck by said electrons in said electron beam at a focal spot on a surface of the rotating anode, at which x-rays are generated and emitted, said rotating anode rotating in a movement direction; and beam modifying structure that interacts with said electrons in said x-ray beam to modify said x-ray beam to produce an asymmetrical power input profile of said focal spot parallel to said movement direction of the rotating anode.

2. A radiation source as claimed in claim 1 wherein said beam modifying structure produces said power input profile with a maximum value and with a leading region that precedes said maximum value, and with an asymmetrically step rise to said maximum value in said leading region.

3. A radiation source as claimed in claim 1 wherein said beam modifying structure interacts with said electrons in said electron beam to produce a symmetrical power input profile of said focal spot perpendicular to said movement direction of said rotating anode.

4. A radiation source as claimed in claim 1 wherein said beam modifying structure interacts with said electrons in said electron beam during generation thereof at said electron emitter.

5. A radiation source as claimed in claim 4 wherein said electron emitter comprises an emission element at which said electrons are generated and emitted, said emission element forming said beam modifying structure and having an asymmetrical thickness causing more electrons to be generated and emitted at a first side of said emission element than at a second side of said emission element.

6. A radiation source as claimed in claim 1 wherein said beam modifying structure interacts with said electrons in said x-ray beam during propagation of said electrons in said x-ray beam from said electron emitter to said rotating anode.

7. A radiation source as claimed in claim 6 wherein said beam modifying structure is a field generator that emits an electromagnetic field through which said electron beam passes between said electron emitter and said rotating anode, said electromagnetic field being configured to produce said asymmetrical power input profile of said focal spot.

8. A radiological imaging system comprising:

a radiation source comprising an electron emitter that emits electrons in an electron beam, a rotating anode struck by said electrons in said electron beam at a focal spot on a surface of the rotating anode, at which x-rays are generated and emitted, said rotating anode rotating in a movement direction, and beam modifying structure that interacts with said electrons in said x-ray beam to modify said x-ray beam to produce an asymmetrical power input profile of said focal spot parallel to said movement direction of the rotating anode;

an x-ray detector on which said x-rays emitted from said x-ray source are incident; and a supporting arrangement that supports said radiation source and said x-ray detector at a distance from each other.

9. A method for operating a radiation source comprising the steps of:

emitting electrons in an electron beam from an electron emitter;

placing a rotating anode in said electron beam and striking said rotating anode with said electrons at a focal spot on a surface of the rotating anode to generate and emit x-rays from said focal spot;

rotating said rotating anode in a movement direction during emission of said x-rays from said focal spot; and modifying said electrons in said electron beam to give said focal spot an asymmetrical power input profile in said movement direction of said rotating anode.

10. A method as claimed in claim 9 comprising modifying said electrons in said electron beam during generation and emission of said electrons.

11. A method as claimed in claim 9 comprising modifying said electrons in said electron beam during propagation of said electrons toward said rotating anode.

12. A method to determine an asymmetrical power input profile of a focal spot on a rotating anode in a radiation source, said focal spot being produced by electrons striking said rotating anode with a spatially dependent power input, and said rotating anode having a spatially dependent temperature with a time curve dependent on said spatially dependent power input, and said rotating anode having a spatially dependent heat dissipation for a predetermined rotation frequency of the rotating anode, and said rotating anode being comprised of anode material having material properties, and wherein said radiation source is used in an imaging system to produce an image having boundary conditions that define an image quality of the image, said method comprising the steps of:

providing a computerized processor with input information representing at least one of said spatially dependent power input, said time curve of said spatially dependent temperature, said spatially dependent heat dissipation, said predetermined rotation frequency, said material properties, and said boundary conditions;

in said computerized processor, executing an optimization method employing an equation embodying said input information to determine, as a result of executing said optimization method, and a symmetrical power input profile of said focal spot parallel to said movement direction of said rotating anode; and making a representation of said asymmetrical power input profile of said focal spot parallel to said movement direction available at an output of said processor.

13. A method as claimed in claim 12 comprising executing said optimization method in said computerized processor to optimize said power input profile of said focal spot parallel to said movement direction of the rotating anode with respect to an optimization parameter selected from the group consisting of a service life of the rotating anode, an optimal image quality of said image, and a lowest power input that produces a predetermined yield of said x-rays.

14. A method as claimed in claim 12 comprising executing said optimization method in said computerized processor with at least one limitation selected from the group consisting of a modulation transfer function of the spatially dependent input power, a maximum temperature of a focal path swept by said focal spot on the rotating anode, and a maximum temperature gradient of the rotating anode.

15. A method as claimed in claim 12 wherein said input information includes said spatially dependent power input and comprising, in said computerized processor, executing a finite element method to determine a time curve for at least one of said spatially dependent temperature and said heat dissipation from said spatially dependent power input.

* * * * *